United States Patent [19]

O'Connor et al.

[11] 4,421,894

[45] Dec. 20, 1983

[54] POLYURETHANE OLIGOMER IMPACT AND SHRINKAGE MODIFIERS FOR THERMOSET POLYESTERS

[75] Inventors: James M. O'Connor, Clinton; Donald L. Lickei, Wallingford; Willie J. Sessions, New Haven, all of Conn.

[73] Assignee: Olin Corporation, New Haven, Conn.

[21] Appl. No.: 210,076

[22] Filed: Nov. 24, 1980

Related U.S. Application Data

[63] Continuation of Ser. No. 16,857, Mar. 2, 1979, abandoned.

[51] Int. Cl.$^3$ .................... C08L 67/06; C08L 67/02
[52] U.S. Cl. .................................. 525/28; 523/500; 525/27; 525/440; 525/920
[58] Field of Search ................. 528/59; 525/28, 440, 525/920; 260/40 TN; 523/500

[56] References Cited

U.S. PATENT DOCUMENTS

| | | | |
|---|---|---|---|
| 3,007,894 | 11/1961 | Bunge et al. | 260/45.4 |
| 3,448,172 | 6/1969 | Damusis et al. | 260/859 |
| 3,557,249 | 1/1971 | Dannels et al. | 260/858 |
| 3,644,569 | 2/1972 | Pietsch et al. | 260/835 |
| 3,772,404 | 11/1973 | Knight et al. | 260/859 R |
| 3,876,726 | 4/1975 | Ford, Jr. et al. | 260/859 R |
| 3,907,751 | 9/1975 | Knight et al. | 260/47 UA |
| 3,954,714 | 5/1976 | Kuehn | 525/920 |
| 4,020,036 | 4/1977 | South, Jr. | 260/40 R |
| 4,062,826 | 12/1977 | Hutchinson et al. | 260/40 TN |
| 4,073,828 | 2/1978 | Ferrarini et al. | 260/859 R |
| 4,119,681 | 10/1978 | Veselovsky | 260/859 R |

FOREIGN PATENT DOCUMENTS 1453840 10/1976 United Kingdom .

OTHER PUBLICATIONS

Atkins, K. E., Koleske, J. V., Smith, P. L., Walter, E. R. and Matthews, V. E., "Mechanism of Low Profile Behavior, I. Influence of Thermoplastic Physical Properties on Performance in Polyester Molding", 31st Annual Technical Conference, 1976, Reinforced Plastics/Composites Institute, The Society of the Plastics Industry, Inc., Section 2-E, pp. 1–9.

Carmen, Jr., A. J., "Total System Concept for Manufacturing Injection Molded Glass Reinforced Polyester Components", Society of Automotive Engineers, Passenger Car Meeting, Detroit Plaza, Detroit, Sep. 26–30, 1977, #770843, pp. 1–9.

Forger, Gary, "Toughened SMC", Published in *Plastics World*, (Jun. 1978), pp. 62–64.

McGarry, F. J., Rowe, E. H. and Riew, C. K., "Improving the Crack Resistance of Bulk Molding Compounds and Sheet Molding Compounds", Published in *Polymer Engineering and Science*, vol. 18, No. 2, Mid--Feb. 1978, pp. 78–86.

Naitove, M. H., "FRP '78: All Eyes on Automotive", Published in Plastics Technology, (Mar. 1978), pp. 67–75.

Rowe, E. H. and Howard, F. H., "Toughening Additive for BMC and SMC", Published in Modern Plastics, (Aug. 1978), pp. 58 and 59.

South, Jr., A. and Werkman, R. T., "Rubber Modifiers for Thermoset Polyesters", 32nd Annual Technical Conference, 1977, Reinforced Plastics/Composites Institute, The Society of the Plastics Industry, Inc., Section 16-D, pp. 1–7.

*Primary Examiner*—Wilbert J. Briggs, Sr.
*Attorney, Agent, or Firm*—William D. Sabo

[57] ABSTRACT

The polyurethane oligomer reaction product of an isocyanate-terminated prepolymer with an isocyanate-reactive unsaturated monomer is incorporated into conventional thermosetting polyester resin formulations to impart improved impact properties and reduced shrinkage behavior.

18 Claims, No Drawings

POLYURETHANE OLIGOMER IMPACT AND SHRINKAGE MODIFIERS FOR THERMOSET POLYESTERS

This is a continuation of application Ser. No. 016,857, filed Mar. 2, 1979, now abandoned.

Usage of plastic materials for exterior components in automotive construction has been steadily increasing over recent years. Fuel economy requirements are continuing to dictate vehicular weight reduction which portends even more extensive utility of plastics.

In the area of rigid plastic automotive components, fiberglass-reinforced thermosetting polyesters have found widespread application. These polyester resin formulations have been favorably accepted due to their overall physical capabilities (e.g., dimensional stability, strength, high temperature resistance, and paint adhesion). Facility of handling and machining also has fostered favor. However, these polyester systems remain to be beset by certain deficiencies. The brittle nature that is characteristic of polyester compounds and composites can lead to severe impact and fatigue problems. Surface smoothness and shrinkage control also have presented formidable difficulties.

Various additives have been suggested for introduction into polyester sheet molding compounds (SMC) and bulk molding compounds (BMC) to relieve shrinkage and surface problems or to improve impact resistance. The addition of liquid polymers, such as polybutadiene (e.g., U.S. Pat. No. 4,020,036 issued to Aubrey South, Jr. on Apr. 26, 1977) has been taught to serve well in regard to toughening polyester products; but, due to incompatibility, storage of such pre-mixes is difficult. Saturated diacids or long-chain glycols also have been used to prepare polyester resins; the resulting polyester products have been flexibilized, but, at the cost of lower mechanical and thermal properties.

An approach relating to the introduction of urethane chemicals to a polyester resin system is described in U.S. Pat. No. 4,062,826 issued to Francis Gowland Hutchinson et al on Dec. 13, 1977. Here, precursors of a cross-linked polyurethane are taught to be polymerized within a mixture of ethylenically unsaturated polyester and vinyl monomer to form a product with an interpenetrating polyurethane gel network within the polyester cross-linked structure. However, while higher impact strengths are reported to be achieved, the fine surface finish required for automotive body part applications still is not accomplished. (G. Forger, "Toughened SMC", Plastics World, page 63, June, 1978.)

None of the prior art polyester additives successfully imparts high impact properties and low shrink characteristics, as well as pre-mix compatibility.

Considerable research has been conducted to determine the probable mechanism of shrinkage control by thermoplastic-thermoset interaction in polyester resin systems. It has been proposed (K. E. Atkins, J. V. Koleske, P. L. Smith, E. R. Walter and V. E. Matthews, "Mechanism of Low Profile Behavior", 31st Annual Tech. Conf., 1976. Reinforced Plastics/Composites Institute, The Society of the Plastics Industry, Inc., Section 2-E, pages 1-3) that the most likely sequence of events that occurs during molding of typical thermosetting polyester-styrene materials containing thermoplastic shrinkage additives is as follows:

(1) As the temperature increases, the organic materials undergo thermal expansion.

(2) The normal cross-linking polymerization of unsaturated polyester and the styrene copolymerizable solvent is initiated and proceeds once the free radical catalyst decomposition takes place.

(3) The thermoplastic, if previously soluble in the polyester, begins to become insoluble and form a separate phase.

(4) The thermoplastic phase, whether previously soluble or insoluble in the polyester, acts as a reservoir for styrene monomer and even some unsaturated polyester.

(6) As the temperature increases, the thermal expansion of the thermoplastic phase creates the force necessary to prevent overall shrinkage during the polymerization reaction. This thermal expansion includes both that of the entrapped unreacted monomers and the thermoplastic.

(6) The next step in the sequence is the polymerization of the remaining styrene monomer and any unsaturated polyester left in the predominantly thermoplastic phase. The polymerized material shrinks, causing void formation within the expanded thermoplastic phase at a time when the matrix is fairly well cured.

(7) When the mold is opened and the part begins to cool, the thermoplastic and the matrix both begin to shrink. When the matrix reaches its glass transition temperature, its shrinkage rate becomes much less than that of the thermoplastic. The shrinking thermoplastic then pulls away from the rigid matrix at the interface and forms voids at the interface and throughout the thermoplastic phase. This void formation serves to relieve strain and prevent further shrinkage of the part.

It has now been discovered, according to the present invention, that by incorporating a select polyurethane oligomer system into a conventional thermosetting polyester resin formulation, a molded plastic product is produced which features improved impact properties as well as low shrinkage to ensure good surface characteristics.

The present discovery appears to support the above-proposed mechanism of shrinkage control. The polyurethane chemical system employed according to the present invention is formed by the reaction of an isocyanate-terminated prepolymer with an isocyanate-reactive unsaturated monomer. The resulting oligomers of controlled molecular weight are readily miscible with polyester resins and hence do not present pre-mix incompatibility storage problems. When the polyurethane oligomer-polyester resin system is processed and molded, upon curing the molded product, the oligomers seem to phase out and form separate pockets or centers within the thermoset polyester matrix. The inclusion of the flexible urethane oligomer accomplishes a significant improvement in impact properties. Moreover, the unique behavior of the oligomers during polyester cure tends to relieve strain ad thus prevent shrinkage and accompanying surface defects.

The polyurethane oligomer that is utilized according to the invention is prepared by first reacting an organic diisocyanate with a polyol in an equivalent ratio of NCO/OH from about 1.02/1 to about 1.6/1, using standard procedures, to yield an isocyanate-terminated prepolymer of controlled molecular weight. Preferably, the NCO/OH ratio ranges from about 1.1/1 to about 1.4/1. Common urethane catalysts, e.g., tertiary amines and metal compounds such as stannous octoate or dibutyltin dilaurate may be used to accelerate the reaction.

The polyol reactant used in the prepolymer formation is selected from polyether polyols and polyester polyols. The polyol can be any such compound or may be mixtures of two or more such compounds. The polyol, or mixture of polyols, should have an average equivalent weight ranging from about 300 to about 4,000. Preferably, the average equivalent weight is about 1,000 to about 3,000. The average functionality of the polyol or polyol blend preferably is about 2 to about 3.

The polyester polyols include the products of reacting polycarboxylic acids with polyhydric alcohols. Illustrative polycarboxylic acids include, for example, oxalic, malonic, succinic, glutaric, adipic, pimelic, suberic, azelaic acid, and the like. Illustrative polyhydric alcohols include various diols, triols, tetrols and higher functionality alcohols, such as ethylene glycol, 1,3-propylene glycol, 1,2-propylene glycol, butylene glycols, butane diols, pentane diols, glycerol, trimethylolpropane, trimethylolhexane, pentaerythritol, sorbitol, hexane 1,2,6-triol, 2-methyl glucoside, mixtures thereof and the like.

Polyether polyols are the preferred polyol reactant. Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiators used in preparing the polyether polyol reactant includes (a) aliphatic diols such as ethylene glycol, 1,3-propylene glycol, 1,2-propylene glycol, butylene glycols, butane diols, pentane diols, and the like, (b) the aliphatic triols such as glyerol, trimethylolpropane, triethylolpropane, trimethylolhexane, and the like, (c) higher functionality alcohols such as sorbitol, pentaerythritol, methyl glucoside, and the like, (d) the polyamines such as tetraethylene diamine and (e) the alkanolamines such as diethanolamine, triethanolamine and the like.

A preferred group of polyhydric initiators for use in preparing the polyether polyol reactant is one which comprises aliphatic diols and triols such as ethylene glycol, propylene glycol, glycerol, trimethylolpropane and the like.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average equivalent weight of about 300 to about 4,000, preferably about 1,000 to about 3,000, and more preferably about 2,000. The catalyst is thereafter preferably removed, leaving a polyether polyol which is ready for use in preparing the isocyanate-terminated prepolymer of the invention.

The organic diisocyanates used in the polyurethane prepolymer formation include toluene diisocyanate, such as the 80:20 or the 65:35 isomer mixture of the 2,4- and 2,6-isomeric forms, ethylene diisocyanate, propylene diisocyanate, methylenebis-(4-phenyl isocyanate), xylene diisocyanate, 3,3'-bitoluene-4,4'-diisocyanate, hexamethylene diisocyanate, naphthalene 1,5-diisocyanate, the polymeric isocyanates such as polyphenylene polymethylene isocyanate, and the like, and mixtures thereof. The amount of isocyanate employed in the prepolymer formation should be sufficient to provide at least about 1.02 to about 1.6 NCO groups per hydroxy group in the reaction system. Preferably, polyisocyanate is used in a proportion to provide about 1.1 to about 1.4 NCO groups per each hydroxy group. Toluene diisocyanate is preferred.

To form the polyurethane oligomer that is utilized according to the invention, the prepared isocyanate-terminated prepolymer, as defined above, is then reacted with an isocyanate reactive group-containing unsaturated monomer, using methods well known in the art, to result in a final free NCO preferably of from 0 to about 1 percent, and most preferably about 0 to about 0.5 percent. Suitable reactive group-containing unsaturated monomers include unsaturated alcohols and amides such as hydroxyethyl acrylate, hydroxypropyl acrylate, hydroxyethyl methacrylate, hydroxyethyl acrylamide, allyl alcohol, t-butylaminoethyl methacrylate, N-(isobutoxymethyl)acrylamide, and the like. By reaction of the isocyanate-terminated prepolymer with the unsaturated monomer, a controlled molecular weight urethane oligomer with terminal reactive unsaturation is produced.

The described polyurethane oligomer is incorporated into thermosetting polyester resin formulations. These polyester resins include conventional polyesters as well as hybrid polyesters such as vinyl esters. The oligomer modifier additive can be used in any effective proportion. Preferably, the oligomer is added in a proportion ranging from about 5 to about 30 parts by weight per 100 parts by weight of polyester resin plus copolymerizable solvent. Most preferably, the oligomer comprises about 10 to about 15 parts by weight per 100 parts by weight of the polyester resin plus copolymerizable solvent. The thermosetting polyester resins generally are prepared by reacting dicarboxylic acids or their anhydrides with polyhydric alcohols, using methods and reactants well known to those skilled in the art of polyester technology. Typical reactants include diacids and anhydrides such as phthalic acid, phthalic anhydride, maleic acid, maleic anhydride, and the like, and glycols, such as ethylene glycol, diethylene glycol, propylene glycol, butylene glycol, butane diol, hexane diol, and the like. The formed polyesters, or the oligomer additives, commonly are diluted for use by dissolving them in reactive copolymerizable solvents. Such copolymerizable solvents include vinylidene compounds such as styrene, vinyl toluene, methacrylic esters, acrylic esters, divinyl benzene, and the like, familiar to those skilled in polyester technology.

The polymerization and curing of the urethane oligomer-containing polyester resin system is effected, using well-known procedures in the art, preferably in the presence of a polymerization catalyst. Curing temperature is dependent on the particular catalyst utilized. Commonly used catalysts are free radical generating catalysts such as peroxide or azo type compounds, known to those in the art. Typical peroxy catalysts are illustrated by organo peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate and the like. Typical azo compounds are azobis-isobutyronitrile, 2-t-butylazo-2-cyano-4-methylpentane, and 4-t-butylazo-4-cyano-valeric acid. The preferred catalyst is t-butyl perbenzoate. The catalyst generally is used in an amount from about 0.1 to about 10 parts by weight per 100 parts by weight of polyester, solvent and oligomer.

The composition of the present invention may also contain other standard ingredients, if desired, such as fillers (e.g., finely divided solids including CaCO3, clay, alumina, talc, glass microspheres, and the like) and reinforcement materials (e.g., chopped fiber glass, carbon fibers, asbestos fibers, boron nitride whiskers, and the like). Other ingredients may include internal mold release agents, such as calcium, zinc, magnesium, or sodium stearate. Pigments, dyes, stabilizers, viscosity modifiers (e.g., Group II metal oxides and hydroxides, such as magnesium oxide) and various additives familiar to those skilled in thermosetting polyester technology also may be added. Other low shrink or impact additives also may be included, if desired. A typical formulation generally contains reinforcement materials in an amount ranging from about 20 to about 300 parts by weight per 100 parts by weight of the polyester resin, copolymerizable solvent, plus oligomer and from about 50 to about 1,000 parts by weight of fillers.

The following examples are provided to further illustrate the invention. All parts are by weight unless otherwise specified.

PREPARATION OF POLYURETHANE OLIGOMER

EXAMPLE 1

977 Grams (0.5 eq) of a polyether polyol was heated to 100° C. and degassed at 0.2 torr pressure for a period of one hour. After cooling to 60° C., 0.6 eq (52.2 g) of diisocyanate was added to the polyol in one portion. The reaction mixture was stirred at 80° C. for one hour and allowed to cool to 70° C. At this time, 0.2 ml of stannous octoate catalyst was added. The reaction temperature rose to 80° C., and a large increase in viscosity was noted within several minutes. After heating at 80° C. for an additional hour, 0.1 eq (11.6 g) of hydroxyethyl acrylate was added. The reaction mixture was stirred at 80° C. for one hour and then held at 80° C. in an oven overnight.

The polyether polyol used had a molecular weight of about 4,000 and was prepared by end-capping a propoxylated dipropylene glycol precursor with ethylene oxide to a final hydroxyl number of about 28.05. The diisocyanate was a mixture of toluene diisocyanate isomers (80:20 mixture of 2.4/2.6-isomers).

EXAMPLES 2 AND 3

Additional polyurethane oligomers were prepared employing the same reactants and conditions as outlined in Example 1. Different proportions of reactants were used, however, to form prepolymers featuring NCO/OH ratios ranging from 1.1 to 1.4. These prepolymers were reacted with suitable proportion of hydroxyl-containing unsaturated monomers to produce oligomers according to the invention. Table I outlines the oligomer composition and properties prepared according to Examples 1-3.

TABLE I

| | OLIGOMER COMPOSITION AND PROPERTIES | | | | | |
|---|---|---|---|---|---|---|
| Example | Polyether Polyol (eq) | Diisocyanate (eq) | Hydroxyethyl Acrylate (eq) | $\bar{M}n$ (GPC)[1] | $R$[2] (GPC) | Viscosity |
| 1 | 1.0 | 1.2 | 0.2 | 11,638 | 1.35 | 276,000 (30° C.) |
| 2 | 1.0 | 1.4 | 0.4 | 6,046 | 1.90 | 85,000 (28° C.) |
| 3 | 1.0 | 1.1 | 0.1 | 15,677 | 1.23 | 1,680,000 (23° C.) |

[1]Gel Permeation Chromatography analysis performed using four styrogel columns: 300, 700, 1,000 and 5000 Å in THF solvent.
[2]$R = \bar{M}w/\bar{M}n$.

PREPARATION OF POLYURETHANE OLIGOMER

EXAMPLE 4

391 Grams (0.2 eq) of polyether polyol and 178 g of styrene solvent (30% by weight of final material) were mixed together. 0.2 Ml of stannous octoate was added to the mixture followed by 0.24 eq (21 g) of diisocyanate added in one portion at ambient temperature. After several minutes, the exotherm had reached 35°-37° C. and external heat was applied. The reaction mixture was stirred at 70° C. for one hour. 0.04 Eq (4.64 g) of hydroxyethyl acrylate was added and the reaction mixture was stirred for one additional hour at 70° C.

The polyether polyol used had a molecular weight of about 4,000 and was prepared by end-capping a propoxylated dipropylene glycol precursor with ethylene oxide to a final hydroxyl number of about 28.05. The diisocyanate was a mixture of toluene diisocyanate isomers (80:20 mixture of 2,4/2,6-isomers).

EXAMPLES 5-7

Additional polyurethane oligomers in styrene solvent were prepared using the same general procedures, reactants and proportions set forth in Example 4. The oligomer compositions produced and their properties are outlined in Table II below.

TABLE II

| | OLIGOMER COMPOSITION AND PROPERTIES | | | | | | |
|---|---|---|---|---|---|---|---|
| Example | Polyether Polyol (eq) | Diisocyanate (eq) | Hydroxyethyl Acrylate (eq) | Solvent | $\bar{M}n$ (GPC)[1] | $R$[2] (GPC) | Viscosity |
| 4 | 1.0 | 1.2 | 0.2 | 30% Styrene | 20,696 | 1.13 | 190,000 (23° C.) |
| 5 | 1.0 | 1.2 | 0.2 | 30% Styrene | 20,107 | 1.14 | 86,000 (23° C.) |
| 6 | 1.0 | 1.2 | 0.2 | 30% Styrene | 16,965 | 1.17 | 52,000 (23° C.) |

TABLE II-continued

OLIGOMER COMPOSITION AND PROPERTIES

| Example | Polyether Polyol (eq) | Diisocyanate (eq) | Hydroxyethyl Acrylate (eq) | Solvent | Mn (GPC)[1] | R[2] (GPC) | Viscosity |
|---|---|---|---|---|---|---|---|
| 7 | 1.0 | 1.2 | 0.2 | 30% Styrene | 18,336 | 1.71 | 58,000 (23° C.) |

[1]Gel Permeation chromatography analysis performed using four styrogel columns: 300, 700, 1,000 and 5,000 Å in THF solvent.
[2]R = Mw/Mn.

POLYESTER MOLDING EXAMPLES 8–22

Thermoset polyester formulations were prepared containing varying amounts of polyurethane oligomer prepared according to Examples 1–3. The polyester molding formulation used in this work is listed in Table III below. The following procedure was followed in the preparation of the cured composites.

a. Into a high shear mixing device was added the polyester resin, oligomer and additional sytrene. (The oligomer may be mixed with part of the styrene before addition to effect solution.)

b. The filler, thickener and catalyst was added and mixed until a homogeneous paste was achieved.

c. Next chopped fiber glass was added gradually in a two roll mill (Baker Perkins mixer or Ross Double Planetary mixer) and the mix was worked the minimal length of time to achieve good wet out of the glass without significant breakdown.

d. The uncured mix was then placed in a mold between the platens of a compression molding machine and cured under pressure (2,000 psi) for three minutes at 300°–325° F.

Alternatively to (d), the mixture may be added by a hopper device to the screw system of an injection molding device to produce an injection molded part.

The physical properties of panels prepared in this manner are included in Table IV below. Flexural modulus and strength properties were determined in accordance with standard test procedures—ASTM D790.

TABLE III

| POLYESTER MOLDING FORMULATION (BMC) | |
|---|---|
| Component | Parts By Weight |
| Polyester Resin[1] | 65 (40% Styrene) |
| Tertiary Butyl Perbenzoate | 0.5 |
| Tertiary Butyl Peroctoate[2] | 0.5 |
| Zinc Stearate | 3.0 |
| Calcium Carbonate | 150 |
| Carbon Black | 5.0 |
| Magnesium Oxide | 1.8 |
| ¼ Inch Glass | 101 |
| Styrene | 35 |
| Polyurethane Oligomer[3] | 0–24.5 |

[1]Commercially available from Hatco under the designation GR 13031.
[2]Commercialy available from Lupersol Co. under the designation PDO, understood to consist of 50% tertiary butyl peroctoate and 50% dioctyl phthalate.
[3]Oligomer is added in five part increments to the standard formulation, i.e., will be used as 5, 10, 15, 20 and 24.5 parts.

TABLE IV

| | FLEXIBLE OLIGOMERS IN BMC | | | | | |
|---|---|---|---|---|---|---|
| Example | Oligomer[1] | phr | Flex. Mod. (psi) | Notched Izod (ft.-lb./in.) | Unnotched Izod (ft.-lb./in.) | Surface[2] (1–10) | Flex. Strength (psi) |
| | Control | 0 | $1.18 \times 10^6$ | 4.73 | 6.95 | 5 | — |
| 8 | Example 2 | 5 | $0.93 \times 10^6$ | 6.31 | 6.65 | — | — |
| 9 | Example 2 | 10 | $1.18 \times 10^6$ | 5.35 | 7.97 | — | 12,800 |
| 10 | Example 2 | 15 | $1.21 \times 10^6$ | 7.07 | 11.06 | — | 11,200 |
| 11 | Example 2 | 20 | $0.80 \times 10^6$ | 7.66 | 7.74 | — | — |
| 12 | Example 2 | 24.5 | $0.65 \times 10^6$ | 5.66 | 8.63 | — | — |
| 13 | Example 1 | 5 | $1.36 \times 10^6$ | 8.50 | 10.69 | 7 | 11,200 |
| 14 | Example 1 | 10 | $1.33 \times 10^6$ | 9.00 | 11.40 | 8 | 11,700 |
| 15 | Example 1 | 15 | $0.90 \times 10^6$ | 8.66 | 12.13 | 8 | 8,800 |
| 16 | Example 1 | 20 | $0.86 \times 10^6$ | 8.36 | 12.53 | 7–8 | 9,200 |
| 17 | Example 1 | 24.5 | $0.88 \times 10^6$ | 7.50 | 12.50 | 7–8 | 10,700 |
| 18 | Example 3 | 5 | $1.26 \times 10^6$ | 5.75 | 10.18 | 7 | 11,000 |
| 19 | Example 3 | 10 | $1.29 \times 10^6$ | 6.37 | 8.15 | 7 | 10,800 |
| 20 | Example 3 | 15 | $0.69 \times 10^6$ | 9.70 | 6.27 | 8 | 6,100 |
| 21 | Example 3 | 20 | $0.96 \times 10^6$ | 5.87 | 9.12 | 8 | 9,900 |
| 22 | Example 3 | 24.5 | $0.75 \times 10^6$ | 6.15 | 6.87 | 7 | 6,400 |

[1]Values for heat sag at 325° F. were all 0.
[2]The surface is rated subjectively from 1–10, 10 having the smoothness of glass while 1 is a fairly rough and uneven surface.

What is claimed is:

1. In a thermosetting polyester resin composition comprising a polyester resin, a catalyst, and at least one of a reinforcing agent or a filler; the improvement comprising the addition of an effective proportion of a polyurethane oligomer modifier, said oligomer prepared by reacting:
   (a) an isocyanate-terminated prepolymer which is the reaction product of an organic diisocyanate with a polyol having an average equivalent weight of about 1,000 to about 3,000, in an equivalent ratio of NCO to OH ranging from about 1.02/1 to about 1.6/1 with
   (b) an isocyanate reactive group-containing unsaturated monomer to result in an oligomer product having terminal reactive unsaturation and a final free NCO content of from 0 to about 1 percent.

2. The composition of claim 1 including a copolymerizable solvent in said polyester resin composition.

3. The composition of claim 2 wherein said copolymerizable solvent is styrene.

4. The composition of claim 2 wherein said oligomer is added in a proportion ranging from about 5 to about 30 parts by weight per 100 parts of the polyester resin plus any copolymerizable solvent.

5. The composition of claim 4 wherein said oligomer is added in a proportion ranging from about 10 to about 15 parts by weight per 100 parts by weight of the polyester resin plus any copolymerizable solvent.

6. The composition of claim 1 wherein the prepolymer is the reaction product of a diisocyanate and a polyol in an equivalent ratio of NCO to OH ranging rom about 1.1/1 to about 1.4/1.

7. The composition of claim 1 wherein the final free NCO content of the oligomer is from about 0 to about 0.5 percent.

8. The composition of claim 1 wherein the isocyanate reactive group-containing unsaturated monomer is selected from unsaturated alcohols and amides.

9. The composition of claim 8 wherein the unsaturated monomer is selected from hydroxyethyl acrylate, hydroxypropyl acrylate, hydroxyethyl methacrylate, hydroxyethyl acrylamide, allyl alcohol, t-butylaminoethyl methacrylate and N-(isobutoxymethyl)acrylamide.

10. The composition of claim 9 wherein the unsaturated monomer is hydroxyethyl acrylate.

11. The composition of claim 1 wherein the prepolymer is prepared from a polyether polyol.

12. The composition of claim 1 wherein said polyether polyol has an average equivalent weight of about 2,000.

13. The composition of claim 1 wherein the prepolymer is prepared using toluene diisocyanate.

14. A composition according to claim 1 wherein said oligomer comprises from about 10 to about 15 parts by weight per 100 parts by weight of polyester resin plus styrene copolymerizable solvent and is prepared by reacting:
(a) an isocyanate-terminated prepolymer which is the reaction product of toluene diisocyanate with a polyether polyol having an average equivalent weight of about 1,000 to about 3,000 in an equivalent ratio of NCO to OH ranging from about 1.1/1 to about 1.4/1 with
(b) hydroxyethyl acrylate to result in an oligomer product having terminal reactive unsaturation and a final free NCO content of from 0 to about 0.5 percent.

15. A method of preparing thermoset polyester compositions comprising mixing polyester resin, catalyst, reinforcing agent, filler and a polyurethane oligomer prepared by reacting:
(a) an isocyanate-terminated prepolymer which is the reaction product of an organic diisocyanate with a polyol, having an average equivalent weight of about 1,000 to about 3,000, in an equivalent ratio of NCO to OH ranging from about 1.02/1 to about 1.6/1 with
(b) an isocyanate reactive group-containing unsaturated monomer to result in an oligomer product having terminal reactive unsaturation and a final free NCO content of from 0 to about 1 percent and curing said composition by application of heat, wherein said oligomer phases out and forms separate pockets or centers within the thermoset polyester matrix.

16. The method of claim 15 wherein said oligomer comprises from about 10 to about 15 parts by weight per 100 parts by weight of polyester resin plus styrene copolymerizable solvent and is prepared by reacting:
(a) an isocyanate-terminated prepolymer which is the reaction product of toluene diisocyanate with a polyether polyol having an average equivalent weight of about 1,000 to about 3,000 in an equivalent ratio of NCO to OH ranging from about 1.1/1 to about 1.4/1 with
(b) hydroxyethyl acrylate to result in an oligomer product having terminal reactive unsaturation and a final free NCO content of from 0 to about 0.5 percent and curing said composition by application of heat.

17. A thermoset polyester article prepared according to the method of claim 15.

18. A thermoset polyester article prepared according to the method of claim 16.

* * * * *